United States Patent
Al Shikh (10) Patent No.: US 11,711,348 B2
(45) Date of Patent: Jul. 25, 2023

(54) METHOD FOR MAINTAINING TRUST AND CREDIBILITY IN A FEDERATED LEARNING ENVIRONMENT

(71) Applicant: Begin AI Inc., Halifax (CA)

(72) Inventor: Rima Al Shikh, Halifax (CA)

(73) Assignee: Begin AI Inc., Halifax (CA)

( * ) Notice: Subject to any disclaimer, the term of this patent is extended or adjusted under 35 U.S.C. 154(b) by 167 days.

(21) Appl. No.: 17/182,051

(22) Filed: Feb. 22, 2021

(65) Prior Publication Data

US 2022/0272074 A1    Aug. 25, 2022

(51) Int. Cl.
*H04L 9/40* (2022.01)
*G06N 20/20* (2019.01)

(52) U.S. Cl.
CPC ......... *H04L 63/0428* (2013.01); *G06N 20/20* (2019.01)

(58) Field of Classification Search
CPC ............................ H04L 63/0428; G06N 20/20
USPC .......................................................... 726/26
See application file for complete search history.

(56) References Cited

U.S. PATENT DOCUMENTS

| | | | |
|---|---|---|---|
| 10,657,461 | B2 | 5/2020 | McMahan et al. |
| 11,139,961 | B2* | 10/2021 | Baracaldo Angel ........................ G06N 3/0454 |
| 2019/0265971 | A1* | 8/2019 | Behzadi ................. G06Q 10/06 |
| 2020/0204572 | A1* | 6/2020 | Jeyakumar ............ H04L 63/123 |
| 2020/0285980 | A1* | 9/2020 | Sharad ................ G06F 21/6245 |
| 2020/0293887 | A1* | 9/2020 | De Brouwer .......... G06K 9/627 |
| 2020/0358599 | A1 | 11/2020 | Baracaldo Angel et al. |
| 2020/0364608 | A1* | 11/2020 | Anwar .................... G06N 20/00 |
| 2021/0073639 | A1* | 3/2021 | Jakkam Reddi ....... G06N 20/20 |
| 2021/0256429 | A1* | 8/2021 | Gilbertson ............. G06N 20/00 |
| 2021/0312336 | A1* | 10/2021 | Sinn ....................... G06N 20/20 |
| 2022/0083916 | A1* | 3/2022 | Khan ..................... G06N 20/00 |

(Continued)

FOREIGN PATENT DOCUMENTS

| | | |
|---|---|---|
| CN | 110598870 A | 12/2019 |
| CN | 110751291 A | 2/2020 |

(Continued)

OTHER PUBLICATIONS

Jarana Manotumruksa et al., Modelling User Preferences using Word Embeddings for Context-Aware Venue Recommendation, arXiv:1606.07828v1 [cs.IR], University of Glasgow, UK, Jun. 24, 2016.

(Continued)

*Primary Examiner* — Amare F Tabor
(74) *Attorney, Agent, or Firm* — Stratford Group Ltd.

(57) ABSTRACT

A system to provide scalable and reliable communication mechanism between a plurality of requesters and a plurality of edge devices comprising one or more requests from said plurality requesters to one or more coordinators discovering one or more edge devices relevant to said request based on one or more search method and directing said requests to the one or more of said edge devices or to other coordinators, wherein the edge device comprises one or more data publishers providing data to an agent to execute said one or more request to create one or more responses and sending said one or more responses to the coordinators which are aggregating said one or more responses and sending to said one or more requesters for further processing.

17 Claims, 9 Drawing Sheets

(56) References Cited

U.S. PATENT DOCUMENTS

2022/0101189 A1\* 3/2022 Ben-Itzhak ......... G06F 21/6218
2022/0180251 A1\* 6/2022 Pezeshki .................. G06N 3/08

FOREIGN PATENT DOCUMENTS

CN            107145977 B     7/2020
CN     WO 2020/248538 A1    12/2020

OTHER PUBLICATIONS

Ludovico Boratto et al., Using Neural Word Embeddings to Model User Behavior and Detect User Segments, Knowledge-Based Systems, DOI: 10.1016/j.knosys.2016.05.002, Oct. 26, 2015.
European Search Report from corresponding EP application No. 22157012.0, dated May 23, 2022.
Bonawitz Keith et al: "Towards Federated Learning at Scale: System Design", Mar. 22, 2019 (Mar. 22, 2019), XP055778083, Retrieved from the Internet: URL: https://arxiv.org/pdf/1902.01046.pdf [retrieved on Feb. 19, 2021].
Takayuki Nishio et al: "Client Selection for Federated Learning with Heterogeneous Resources in Mobile Edge", arxiv.org, Cornell University Library, 201 Olin Library Cornell University Ithaca, NY 14853, Apr. 23, 2018 (Apr. 23, 2018), XP081228794.
Anonymous: "Semantic vector search: the new frontier in product discovery", Sep. 21, 2020 (Sep. 21, 2020), pp. 1-11, XP055821990, Retrieved from the Internet: URL: https://web.archive.org/web/20200921000147/https://blog.griddynamics.com/semanti c-vector-search-the-new-frontier-in-product-discovery/ [retrieved on Jul. 7, 2021].

\* cited by examiner

METHOD FOR MAINTAINING TRUST AND CREDIBILITY IN A FEDERATED LEARNING ENVIRONMENT

FIELD OF THE INVENTION

The present disclosure relates to machine learning and data analysis, specifically private federated learning on edge devices in relation to enterprise consumer engagement methods generating cross-insights, cross learning and collective decision making from one or more data sets that relate to the same user.

BRIEF SUMMARY

It is the object of the present invention to provide a system to provide scalable and reliable communication mechanism between a plurality of requesters and a plurality of edge devices.

In accordance with an aspect of the invention, there are provided one or more requests from said plurality requesters to one or more coordinators with said coordinators discovering one or more edge devices relevant to said request based on one or more search method and directing said requests to the one or more of said edge devices or to other coordinators; wherein said edge device comprises one or more data publishers providing data to an agent to execute said one or more request to create one or more responses and sending said one or more responses to said coordinators; and said one or more coordinators aggregating said one or more responses and sending to said one or more requesters for further processing.

In accordance with an embodiment of the invention, the one or more search method is a vector search.

In accordance with an embodiment of the invention, the one or more search method is based on metadata known through journaling.

In accordance with an embodiment of the invention, the one or more search method is done by coordinators specialized in specific types of edge devices.

In accordance with an embodiment of the invention, the one or more search method is done by coordinators specialized in specific geographies.

In accordance with an embodiment of the invention, the one or more search method is done by coordinators specialized in specific datasets.

In accordance with an embodiment of the invention, the vector search is based on one or more unique signatures which is a vector representation of one or more parameter.

In accordance with an embodiment of the invention, the signature can be used by the one or more coordinator to apply a weight to the response from the edge device.

In accordance with an embodiment of the invention, the plurality of edge devices can be grouped based on pre-determined criteria and treated as a cloud of edge devices by the search.

In accordance with an embodiment of the invention, the cloud of edge devices comprises one or more agents executed on a processor they coordinate the use of edge devices resources processing power and storage to execute requests received and manage the responses to be kept or discarded.

In accordance with an embodiment of the invention, additional mechanisms are used to evaluate a data quality to rank the data publishers based on a quality of the responses provided.

In accordance with an embodiment of the invention, one or more data journaling authority provide feedback mechanism to data publishers on a quality of responses.

In accordance with an embodiment of the invention, a coordinator authority to manage the coordinators version.

In accordance with an embodiment of the invention, the computations are selected from the group consisting of machine learning training using federated learning, machine learning inference, collaborative decisions and secure multi-party computations.

The foregoing and additional aspects and embodiments of the present disclosure will be apparent to those of ordinary skill in the art in view of the detailed description of various embodiments and/or aspects, which is made with reference to the drawings, a brief description of which is provided next.

BACKGROUND

Currently edge devices (herein comprising but not limited to laptop, computer, mobile phone, TV, VR Headset, car, internet of things sensors, etc.) are often equipped with processing and storage hardware that make it feasible for them to perform a range of computations on these devices including machine learning algorithm training and inference. Thus, there has been a recent rise in solutions and methods to learn from data generated by these edge devices while reducing the demand on data transfer from these edge devices to central servers. An example of these methods is federated learning systems that have provided methods to train a machine learning algorithm from data generated by edge devices without copying the data to central servers, federated learning instead sends the model and the model weights to the edge devices and aggregates the updated weights returned from devices through averaging methods. Federated learning methods are useful for an enterprise that develops applications that run on these edge devices to learn from their own users data; whereby the enterprise users are persons who engage with the applications developed by the enterprise. However, federated learning remains impractical for multiple enterprises to learn from one another on the edge and that is due to possibility of revealing the information that is transferred in the form of model weight updates from the edge device to the aggregator server which in turn poses a security, regulatory and privacy risk for enterprises that attempt to cross-learn from one another on the edge. These risks become more visible at bigger scale such as increased number of users and increased number of devices per user.

The increased fragmentation of user data on the same device as each enterprise controls a fragment of the user's data through an application that runs on a device, only makes the problem even more complex to solve. When a large population of users are involved, these fragmentations of datasets make it very challenging to build global systems with the tools available today that can learn from user's behaviour, interests and intentions and provide those users with relevant services from enterprises without competing on the user's engagement time.

The challenge with this model, is that successful development and training of machine learning solutions is highly dependent on the ability of the enterprise to capture the attention of the user, and engage them in a diverse set of activities that will generate sufficient feature space for any machine learning model, especially deep learning models that require higher degree of diversity in the data than other data models.

The fragmentation of power of the mobile device as enterprises compete for this power and the fragmentation of datasets is not benefiting the user nor it is maximizing the benefits for the enterprise.

Some problems remain very difficult to solve with these silos, as many users work to fool the system by knowing the input the system expects of them. Even worse, when the user experience is well designed, the user often is driven through a particular behavioural funnel even though their intentions may not be well aligned with the enterprise intentions. An example of such situation, is a scammer, when an user, has the intentions of fooling the enterprise application in order to incentivize a certain behaviour in other users of the platform operated by the enterprise. When the enterprise has limited visibility on the user's behaviour, it is very challenging for them to develop a machine learning model that can detect those scammers as the model will be dependent on their ability to drive frequent engagement by users that is required to a sufficient feature space for training such model. Detecting scammers is an objective that many enterprises may agree to solve collaboratively together given the right tools.

This issue naturally leaves many enterprises behind and increases the barrier to entry for most enterprises as to get the right level of engagement started to generate sufficient volumes of data.

There is a need for a complete system that enables enterprises to collaborate on the edge devices, that works for multiple enterprise sizes, of varied security concerns and varied user demographics.

Previous art does not examine the many to many situations in federated learning and instead treats many to many in a similar fashion to one to many, but that is impractical. Many enterprises cross-learning on the edge especially when there are many devices concerning one user or one concept in general, requires a lot more coordination than one enterprise to many devices.

This disclosure provides practical methods and solutions to enable scalable and dynamic cross-learning on the edge, and the disclosed methods can be generalized to include servers and other devices.

BRIEF DESCRIPTION OF THE DRAWINGS

The foregoing and other advantages of the disclosure will become apparent upon reading the following detailed description and upon reference to the drawings.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

The disclosed system's objective is to provide a reliable communication mechanism to direct requests from requesters to edge devices that are interested in these computation requests and capable of performing them and providing an aggregate response back to the requesters. It also solves for enabling enterprises to learn from data either controlled by the enterprise itself or datasets owned or controlled by other enterprises as these datasets generate on edge devices without compromising the security of the datasets. The system does that through highly flexible systems coordination and collaboration methods.

Figure 1:
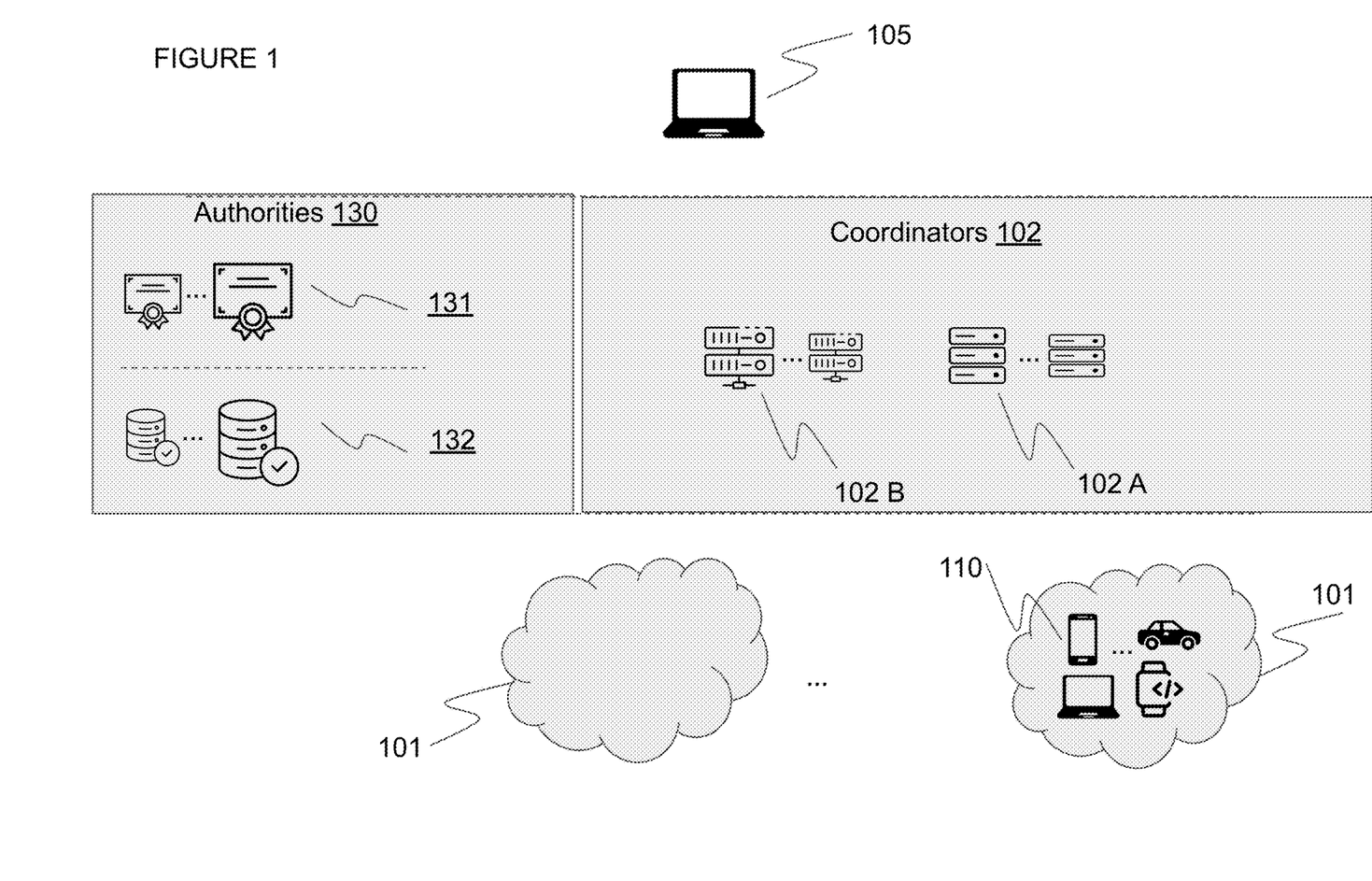
FIG. 1 depicts an overall system design of multiple actors involved in one embodiment.

FIG. 1 depicts an overall system design of multiple actors that represent user devices, computation requesters referred to as "Requesters", systems that act as coordinators of these requests referred to as "Coordinators" and authoritarian systems that maintain the overall credibility of the system referred to collectively as "Authorities".

As seen in FIG. 1, Requester 105 can be an independent person or an enterprise interested in performing a computation on datasets that are generated on edge devices. Such computations can be machine learning training using federated learning, machine learning inference, collaborative decisions is described further as well as other computations such as secure multi-party computations.

101 describes a "NanoCloud" that is a group of devices that share a common objective. An embodiment of a NanoCloud is a group of edge devices that belong to one person (or referred hereafter as "user"), such as the user's wearables, car, smart phone, fridge, VR headset and other edge devices.

When the type of computation is not specified, it is generally referred herein as "Computation". The Requester submits the request over a network protocol, for example "http" in a machine-readable format such as JavaScript Object Notation to a Coordinator 102 that is accessible to the Requester over a private or public network. The Coordinator 102 is a software that runs as a server and can be accessed by the Requester and can either access the edge devices directly or through other coordinators. 102B depicts Level0 Coordinators that do not interact directly with NanoClouds and can only interact with other Coordinators but can interact directly with Requesters whereas 102A depicts Coordinators that can directly interact with NanoClouds, with Requesters and can interact with other Coordinators these are referred to as Level1 Coordinators.

The nature of Coordinator interactions is described in greater details in this disclosure. The purpose of this design is to allow for flexibility in designing scalable networks that often require the ability to group NanoClouds under sub-networks. The Requests then reach the NanoClouds 101 through the Coordinators either via pub/sub architecture where the NanoClouds subscribe to a bus that the Coordinators 102A publish Requests to or through other protocols like HTTP and SFTP, where the NanoClouds checks for new Requests with Coordinators 102A that are known to these NanoClouds.

A NanoCloud consists of at least one edge device. Each of these devices often has an operating system and one or more application that generate data, that data is often related to the interactions the person makes with the device or the systems running on the device, as well as other data that is related to the conditions of usage and the devices themselves, the enterprises or persons that develop these applications and/or operating systems are referred to hereafter as Publishers 110.

An another example of an embodiment of a NanoCloud is a convoy of cars driving together with the common objective of scanning a remote landscape, the Publishers in this case are the developers of the many software that run on the cars computers and generate data for different purposes such as the drivers' profiles, each car's systems and so on.

Publishers, Requesters and Coordinators referred to hereafter as Key Actors interact with Authorities 130 which are multiple parties that are responsible for maintaining the overall credibility and trust of the system. When deploying this system at a small scale for example two enterprises cross-learning from each others' users data, the authorities can be one of the enterprises or an independent $3^{rd}$ party. As the number of Key Actors increase in the system, the number of independent Authorities required to maintain the credibility of the system increases, this disclosure does not set an upper limit to the number of Authorities in the system.

Figure 2:
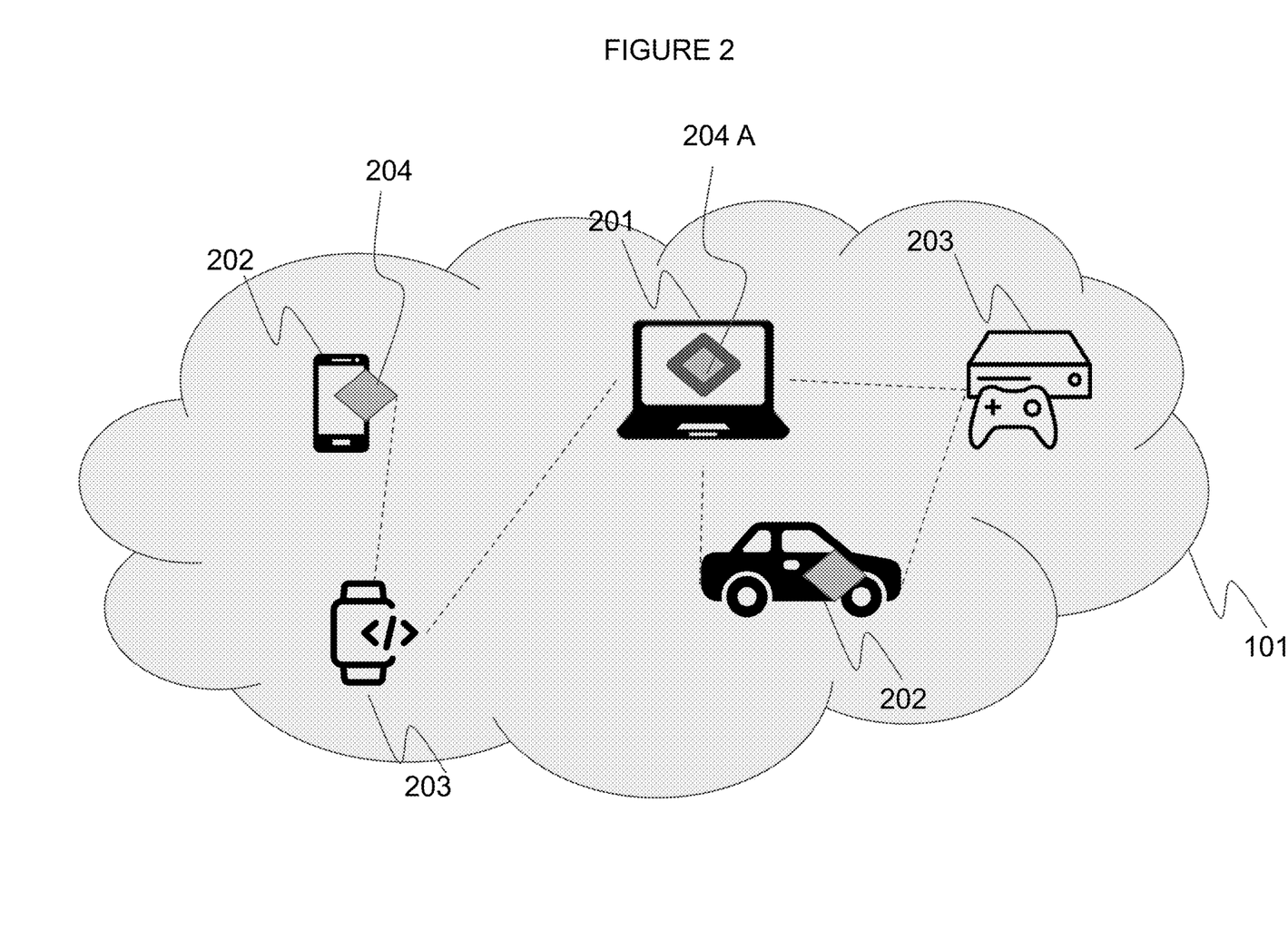
FIG. 2 depicts an example of a group of edge devices that belong to the same person.

FIG. 2 depicts an example of a group of edge devices that belong to the same person collectively are a NanoCloud, the figures show the processes by which these edge devices connect and share data and computations inside the NanoCloud based on this disclosure.

FIG. 2 depicts the internal affairs of a NanoCloud as per this disclosure. This disclosure describes a software system referred to as Agent 204 that can run on one or many devices in a NanoCloud, the Agent's role is to execute requested Computations and orchestrate the use of hardware resources of the devices in the NanoCloud for the purpose of the Requested Computations and to store relevant datasets that are shared with the said Agent by Publishers in the NanoCloud where such orchestration of resources and data storage is described in further details in this disclosure.

Devices 202 have an Agent software installed on them. When an Agent software is the nominated Agent to interact with Coordinators, this Agent is referred to as Gateway Agent 204A Agents within a NanoCloud nominate one of them to act as Gateway Agent, that is usually the first Agent to be turned on or the Agent with the highest resources such as battery power, processing power, network bandwidth where such nomination criteria can be designed by the implementer of the system. 201 shows a device that has a Gateway Agent running, in this example the Gateway Agent is running on a laptop, that is because the laptop in this example is more available online than other devices in the NanoCloud and has the highest network bandwidth and has powerful processing and storage hardware available to it in comparison to other devices in the NanoCloud, for example in comparison to the car in FIG. 2 which may have powerful computers but its availability within the NanoCloud is low, as it drives out and turns off often when it's in the NanoCloud and is from time to time connected to the laptop to share data with the Agent available on the laptop. 203 shows devices that have no local Agent running on them, Publishers on these devices share data instead with the first available Agent in the NanoCloud or in some embodiment may have specified Agents to share with. Publishers are able to discover Agents in the NanoCloud's network to share data with. The network of a NanoCloud can be any network that the devices of the NanoCloud can connect through to the Agents of the NanoCloud. Agents of a NanoCloud need to be able to send Computation Requests to devices in the NanoCloud from time to time and need to be able receive data from Publishers in the NanoCloud.

An example of a NanoCloud network is a home wifi that the devices of a user can connect to, through this network these devices can connect with Agents installed on some, all or one of them.

Figure 3:
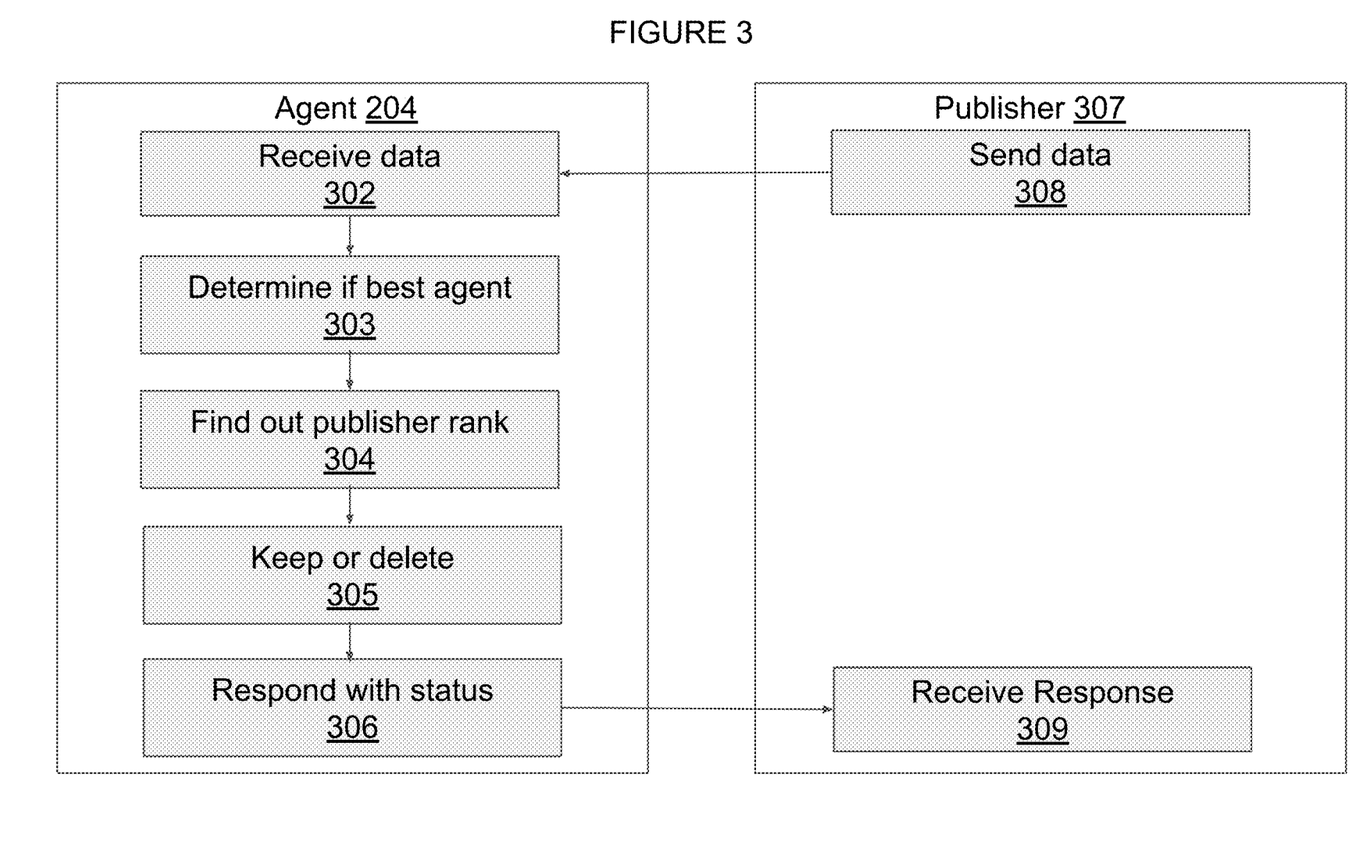
FIG. 3 depicts a flow chart diagram that describes one embodiment.

FIG. 3 depicts a flow chart diagram that describes the process of how application developers that are referred to hereafter as Publishers can share data from their applications to the data and process coordinator software running on the edge devices, this software is referred to as Agents in this disclosure.

FIG. 3 depicts the process of how Publishers share data with Agents. A Publisher 307 sends data 308 to either a specific Agent or to a random Agent in the NanoCloud, in the embodiment 2 of the NanoCloud the shared data can be information about the user or information about activities the user has performed that the Publisher keeps track of. The Agent receives the data 302 and then based on the data received, determines if the Agent is the best Agent to receive this data, it is also possible that a request to send the data is first shared by the Publisher with the Agent, to ensure the Agent is able to receive it prior to the Publisher sending it. The Agent makes the decision on whether it's able to receive the data based on the required memory capacity and the required network bandwidth, in another embodiment the decision can be based on speed of transfer, size of the data or device battery time or other resource defining parameters. The Agent may reject the data in which case, the Agent may recommend another Agent in the NanoCloud or not. If the Agent accepted the data based on the resources available to the Agent, it attempts to find out the Publisher's rank 304 by contacting an Authority, named the "Data Journaling Authority" described in greater detail in FIG. 6 of this disclosure.

The rank of the Publisher determines the importance of this Publisher's data to the Agent as the Rank describes the quality of the Publisher's data in the overall system and their credibility as described further in this disclosure. Based on Agent specified thresholds of rank, the Agent determines whether it accepts the data based on the Publisher's rank or to simply delete it 305, the Agent then informs the Publisher of its final decision 306. Agents in the same NanoCloud can be configured to all have the same Publisher's rank threshold or can have a dynamic threshold based on available resources or can have different thresholds based on their available resources. When a Publisher receives the Agent's decision 309, the Publisher may use this information as feedback on the quality of their dataset and attempt to improve it through product enhancements or other techniques to the Publisher's own disclosure.

Figure 4:
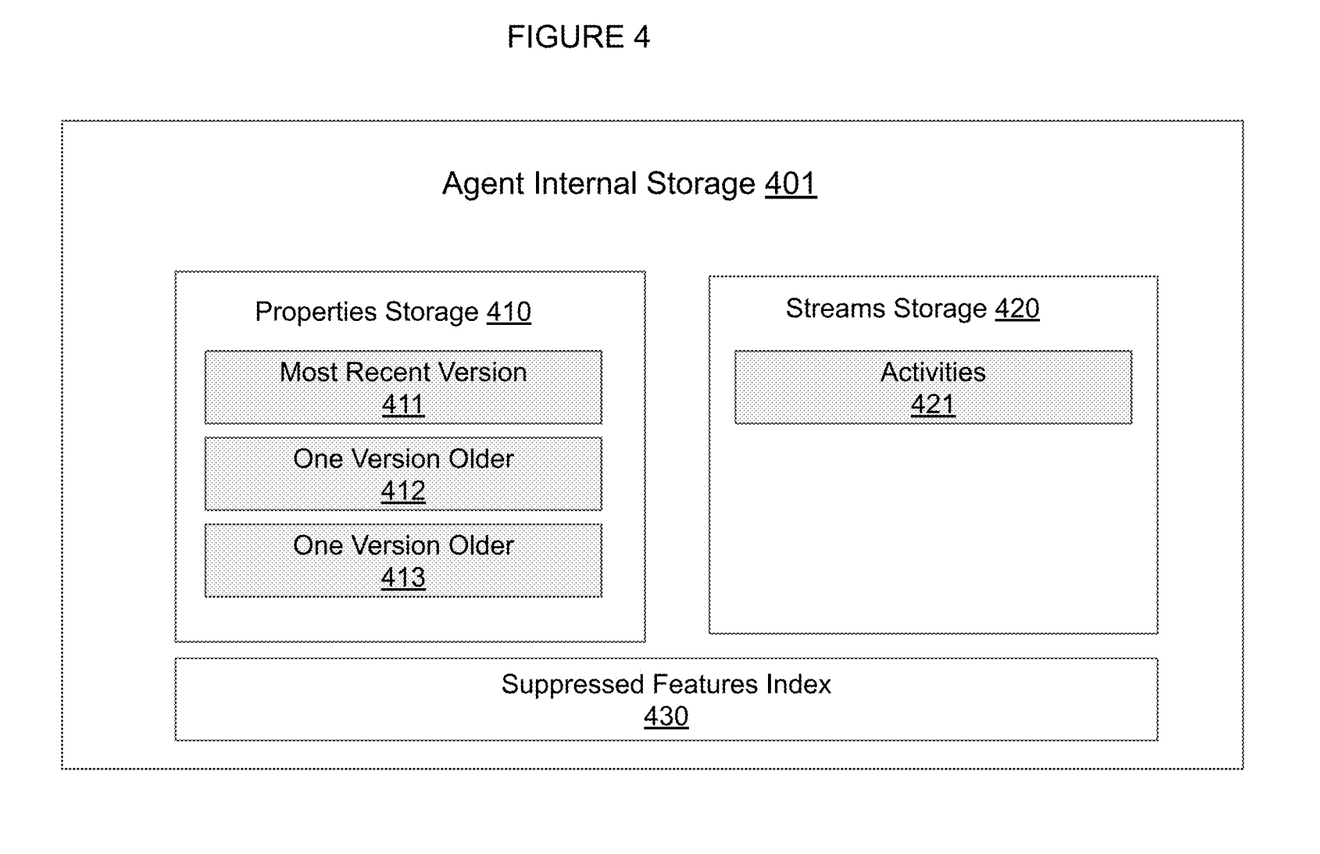
FIG. 4 depicts a diagram that describes the types of data the software agents store.

FIG. 4 describes the internal storage of an Agent. An Agent in general maintains two types of data in its internal storage, properties 410 which in this embodiment can be in the form of a matrix of user information such as age, gender, name, income, number of children, and other slow changing dimensions. In another embodiment such as the NanoCloud of cars convoy this could be a matrix of car model, manufacturer and so on.

Figure 6:
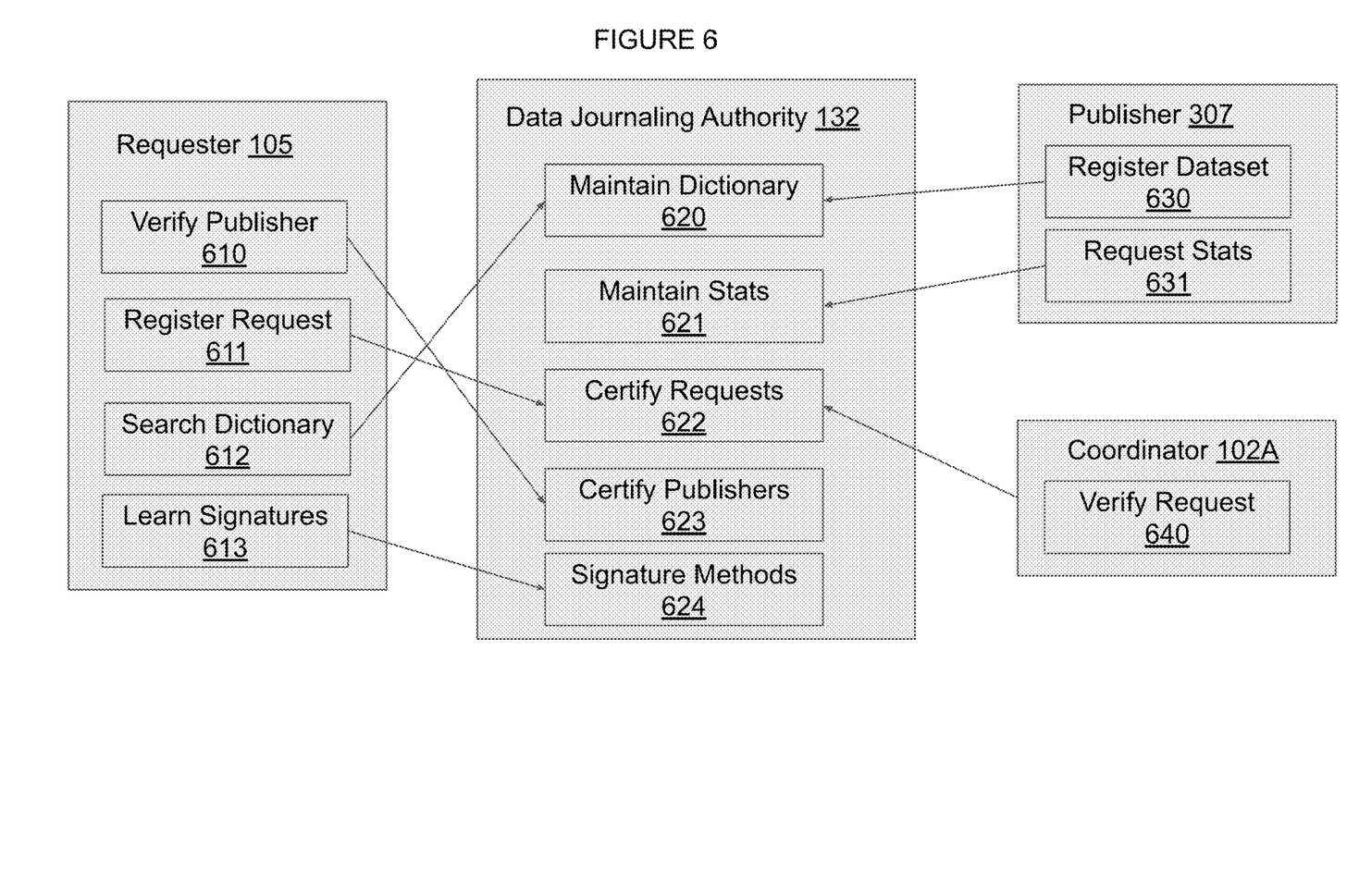
FIG. 6 depicts a flow chart diagram that describes the processes by which an authority responsible for maintaining the data quality in the system.

Since the Agent receives information from different Publishers that may be describing the same object or user, the Agent has the option to store multiple versions of the same object, these versions can be selected based on the rank of the publisher 304 and the number of versions can be decided based on the available storage, Agents may limit the properties it stores, for example may choose to not store the name of the user based on the description of the property provided to it from the Data Journaling Authority FIG. 6, properties that are available to the Agent that the Agent chooses not to store are then optionally flagged in 430 a local index in the Agent's storage "The Suppressed Properties Index" the purpose of this index is to make it known to systems in the NanoCloud and potentially Requesters of available properties by Publishers in the NanoCloud that are not stored by the Agents.

In some embodiments Agents share The Suppressed Properties Index with a Data Journaling Authority which in turn then uses this information to contribute to the calculation of the Publisher Rank that is described in further details in FIG. 6. In some embodiments this information is shared with Requesters in aggregate form, as the Agents respond to Requests by highlighting properties that are identified by the Request but are suppressed by the Agent. In other embodiment the Publishers themselves provide information about the Suppressed Properties Indexes to the Data Journaling Authorities.

The second type of data stored by Agents is streams 420 which are suitable for rapidly changing dimensions and time series data for example measurements of battery status or in this embodiment the activities the user performs where in this embodiment each data point in the storage can be the activity name, the date and time of the activity and any available measurement such as the duration of the activity, an example activity can be a user login to an application, the time and date of login and the time spent on the login screen as a measurement.

Figure 5:
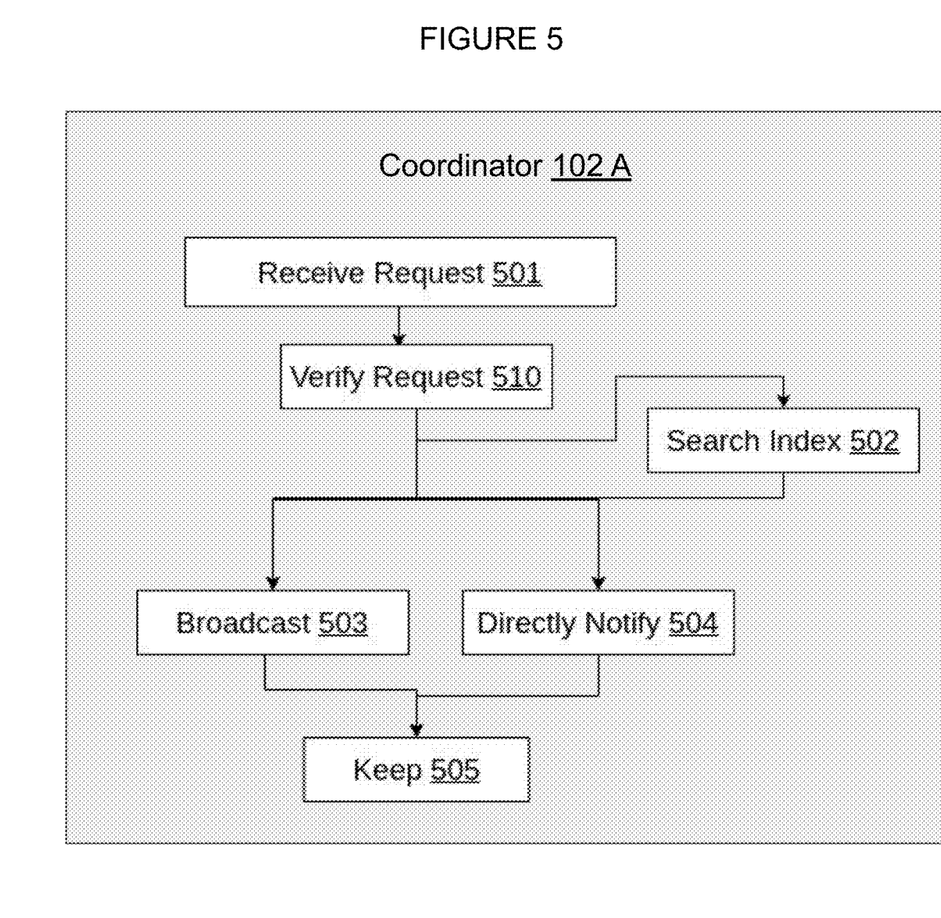
FIG. 5 depicts a flow chart diagram that describes the process that Coordinators use to direct Requests to edge devices.

FIG. 5 depicts how a Coordinator Level 1102 A handles an incoming Request. In this disclosure Coordinators have some flexibility on how to handle Requests. The purpose of the flexibility is to allow for different use cases. The flow chart in FIG. 5 describes the methods the Coordinator can use to handle the Request. When a Coordinator receives a Request through its web server 501 it is then expected to verify the Request 510 with a Data Journaling Authority 132 whose functions are described in greater details in FIG. 6. The purpose of verifying the Request is to ensure the Requester has provided information about the datasets the Request requires and has selected the Publishers of these datasets and has provided any additional information the Data Journaling Authority may require, the process the Requester follows to provide this information is described in 611 as Request registration. After the Coordinator verifies the Request 510 it can optionally provide a search service against its available NanoClouds, where an available NanoCloud is any NanoCloud the Coordinator is able to forward to whether directly or through other Coordinators. Providing the search service 502 enables Requesters to define a criteria of NanoClouds to perform the Request in, for example the Requester may only be interested in performing a Computation against cars of a certain model that have driven in the snow in the past few months. A criteria as such can be provided by the Requester in the form of properties and their target values in the form {'weather': 'snow', 'device': 'car', 'activity': 'recent', 'publishers':['A', . . . , 'N']} this criteria maps to properties that are made available by the specified Publishers, where information about these properties are made available to Requesters by Publishers through Data Journaling Authorities 132 as is described in FIG. 6.

In order to support such level of search, Coordinators may specialize in geographical areas, devices, datasets or combinations of such. For example, a Coordinator can specialize in medical datasets, another can specialize in cars. This level of specialization allows for specializing the services the Coordinators provide, for example a Coordinator specialized in medical data may increase the requirements on encryption and communication with NanoClouds and introduce advanced authentication, and advanced encryption on model weights and models exchanged. A Coordinator specialized in cars can provide an advanced search index on cars properties such as model, make, fuel consumption categories and so on.

Coordinators are registered with their specializations in Coordination Authorities 130 which Requesters can query for learning about the Coordinators services.

If a Request needed to travel through a large number of Coordinators, Coordinators resolve amongst themselves the direction of a Request to reach the final destination. This is done through the criteria, as it gets passed from one Coordinator to another, Coordinators that can't support the Criteria rejects the Request. Coordination Authorities can also provide additional information that help the Requester choose the best Coordinators for their Request, such information can include a map of Coordinators or best route to maximize number of NanoClouds reached that match a criteria or to reduce the number of network jumps required to reach a target segment, where a target segment is the corresponding NanoClouds to the Requester's criteria.

In large implementations Coordinators may be divided in zones based on their specializations. In an embodiment where detailed routes are available, these routes can be included in the Request and are resolved by Coordinators, where Coordinators direct the Request to the next intended actor in the route and similarly a Response route can be described as well.

Once a Coordinator has determined its ability to support a Request, it does one of two things or both of them depending on its implementation:

Option 1: Notify NanoClouds that match the criteria directly 504, this is useful when a Coordinator is coordinating a small number of NanoClouds, this notification can be done through a predefined network communication protocol such as HTTP end point provided by the Agents in the NanoClouds.

Option 2: Broadcast the Request through one or more communication buses that NanoClouds are subscribed to 503.

After communicating the Request, the Coordinator keep the Request 505 in a local storage for a period of time usually defined by the Requester or as the Coordinator implementer finds useful to the purpose of the Coordinator. For example, keeping a Request for 1 week may be reasonable for a Computation that takes about 1 week to complete. The purpose of keeping the Request is to allow NanoClouds to recover it in case they lost it, or fetch it again as a backup or to allow for new NanoClouds or Agents that come online after the Request has been communicated to NanoCloud to fetch these Requests. It is possible for a Coordinator to not send any notifications about new Requests, and simply wait for NanoClouds to check with them frequently for new Requests. While FIG. 5 depicts Coordinator 102A of level 1, Coordinators of level 0 operate in the same fashion, but instead of notifying NanoClouds or publishing to buses that have NanoClouds listening to them, they are only able to notify other coordinators of either levels directly or publish to buses that other Coordinators of either levels listen to.

Coordinators search index service 502 can also be equipped with the feature of Vector search where the Coordinator by a measure of similarity compares signatures of known NanoClouds against the signature of the Requester. These signatures are described in greater details in FIG. 9. A Requester has one or more unique embedded vector signature, and a NanoCloud has one or more unique embedded vector signature each referred to hereafter as Signature where the Signature represents the intentions, interests and/or the objectives of the holder of such Signature that is either the Requester or the NanoCloud. Measuring the distance between the Signatures is done by a measure of distance such as cosine similarity and this process provides an insight into the potential interest of the NanoCloud in the request of the Requester.

By measuring this distance, Coordinators have an opportunity to prioritize or/and monetize Requests based on the distance between the Requester and the NanoCloud. An embodiment of this method is if a Coordinator was configured to support local business owners and so a Yoga teacher who is sending a request for insight from people interested in Yoga in their neighbourhood, provided they have the interfaces and skills to submit such Request the Signature of the Yoga teacher and the Signature of NanoClouds that represent people interested in Yoga in that neighbourhood may be very similar assuming the Signature include geographic and demographic properties in the vector in this case the Coordinator may provide the service of this Request at no cost in comparison to other Requests that require communication with larger populations or are submitted by enterprises from outside the neighborhood.

Coordinators may maintain a list of all Publishers that Publish to NanoClouds these Coordinators are able to connect with. Coordinators may also choose to keep information about neighbouring Coordinators where a neighbouring Coordinator is one that this Coordinator is able to forward Requests to. The amount of information a Coordinator keeps about Publishers, NanoClouds and neighbouring Coordinators depends on the resources available to it and the interests of the implementer. Coordinators can advertise any of their available information to the Coordination Authorities 130, which in turn may choose to advertise some or all of this information to Requesters or other parties 730 interested in verifying Coordinators.

A device can join multiple NanoClouds, for example a car can be part of the NanoCloud in embodiment 2 and also in the cars convoy example. This does not cause any additional configuration as Agents in a NanoCloud are aware of the devices available in the NanoCloud and Publishers can be aware of the availability of multiple NanoClouds or simply share data with all Agents it can discover in the networks the device running the Publisher's applications or operating systems are connected to. The implementation of these options is done via enabling Agent self-identification in the network which includes a NanoCloud name, so that when an Agent identifies to a Publisher it shares its address on the network, the name of the NanoCloud and any other meta data that is relevant to the setup of the system. By doing so, the Publisher can then decide which NanoCloud it is interested in.

FIG. 6 depicts the functions of the Data Journaling Authority 132 this authority plays a number of roles in the system:

1. Provide information about datasets and Publishers available in the system so that Requesters can design their Requests accordingly, this is done by maintaining a data dictionary 620 and by maintaining usage stats 621. These stats are then used to determine the Publisher's Rank 304. In one embodiment a Publisher's Rank can be based on the popularity of its datasets normalized [0-1] in such a way that a Publisher whose datasets are most used would get a rank closest to 1, and one of least used gets a rank closest to 0. Ranking the Publisher can be based on any algorithm that make the Rank useful in selecting the Publisher for the purpose of the Request.

2. Register and Certify Requests to ensure Requests that are forwarded in the network are verified to adhere to standards this Authority 132 may set. In one embodiment this Authority sets a standards that makes it required that the Request provides the number of NanoClouds needed to participate in a Request for a Request to be successful and that this number needs to be more than 2 NanoClouds, a rule like that helps avoiding Requesters that target a single user.

3. Provide Publishers with statistics 631 about the popularity of their datasets and the purposes these datasets are used for in order for Publishers to improve the quality of their datasets. Data Journaling Authorities may provide methods for Publishers to block certain Requesters from Requesting Computations on their datasets, these blocks are then communicated with the Coordinators by the Data Journaling Authorities to prevent them at the time of verifying the request 640.

When a Requester designs their Request, they can request information about the Publishers of certain datasets 610. They can also search the descriptions of datasets 612 to the level provided by Publishers 630. Requesters are expected to Register their Request 611 before sending it to Coordinators.

Figure 7:
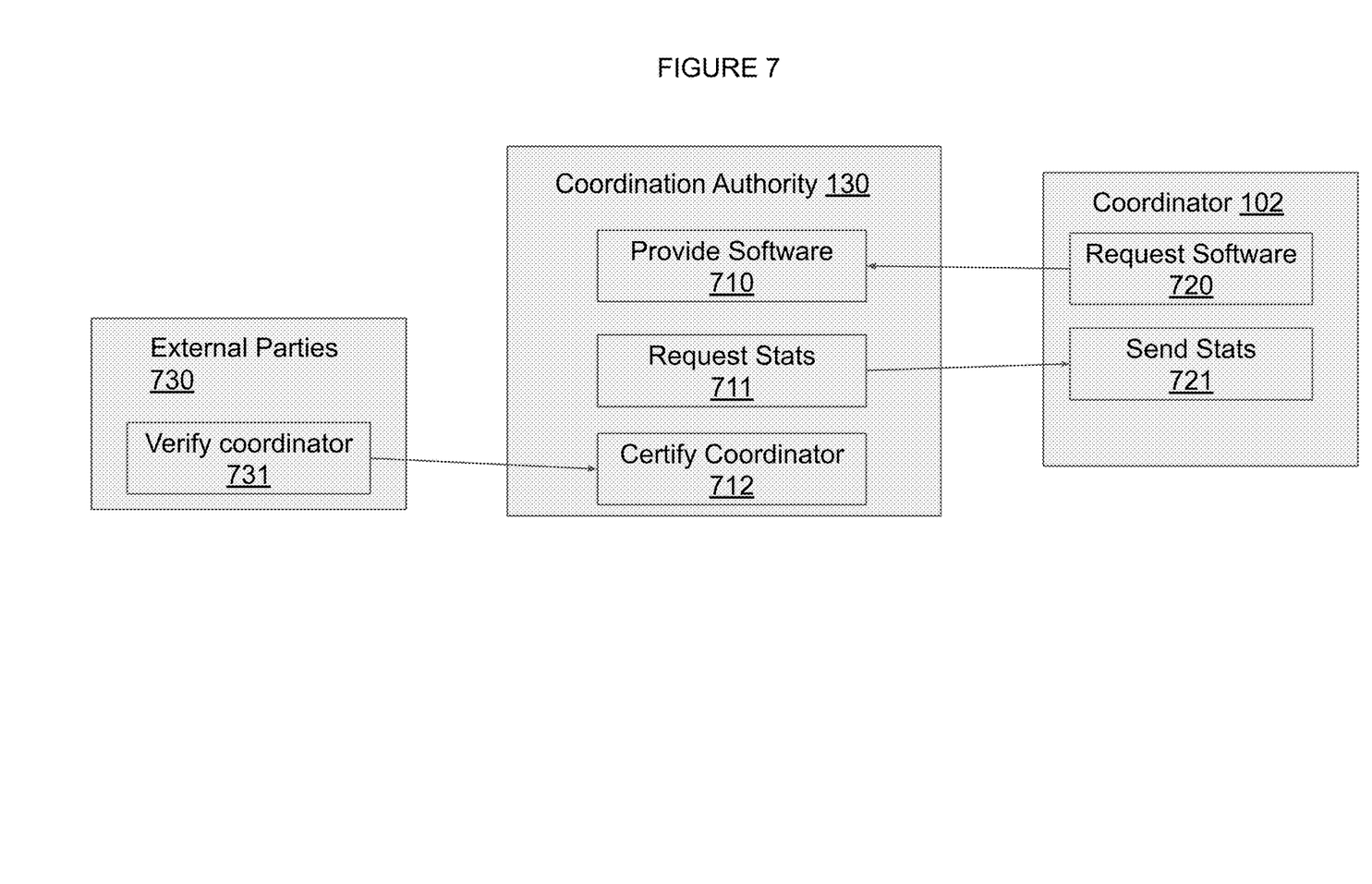
FIG. 7 depicts a flow chart diagram that describes the processes by which an authority responsible for validating and verifying the credibility of coordinators in the system.

FIG. 7 depicts a flow chart diagram that describes the processes by which an authority responsible for verifying coordinators in and their credibility in the system, named "Coordination Authority", performs its tasks and communicates with other actors.

The role the Coordination Authority plays is to ensure Coordinators use a standard software and perform standard tasks on the communicated information back and forth with NanoClouds. In order for a Coordinator to be known to other actors in the system, it needs to inform a Coordination Authority of its presence, and it needs to download the latest version of the Coordination Software 710 from the Coordination Authority, whenever there is a version update of the Coordination Software, Coordinators are expected to ensure the new version is downloaded and is operational 720. The Coordination Authority frequently requests operations statistics from Coordinators 711 and Coordinators are expected to respond with the available stats 721 these stats may include number of Requests it has coordinated, the timestamps of these Requests, the number of Requests that were sent to NanoClouds or/and other Coordinators the number of corresponding Responses processed for these Requests. The Coordination Authority 130 uses these statistics to verify and based on this verification to Certify the Coordinator to other actors in the system.

Figure 8:
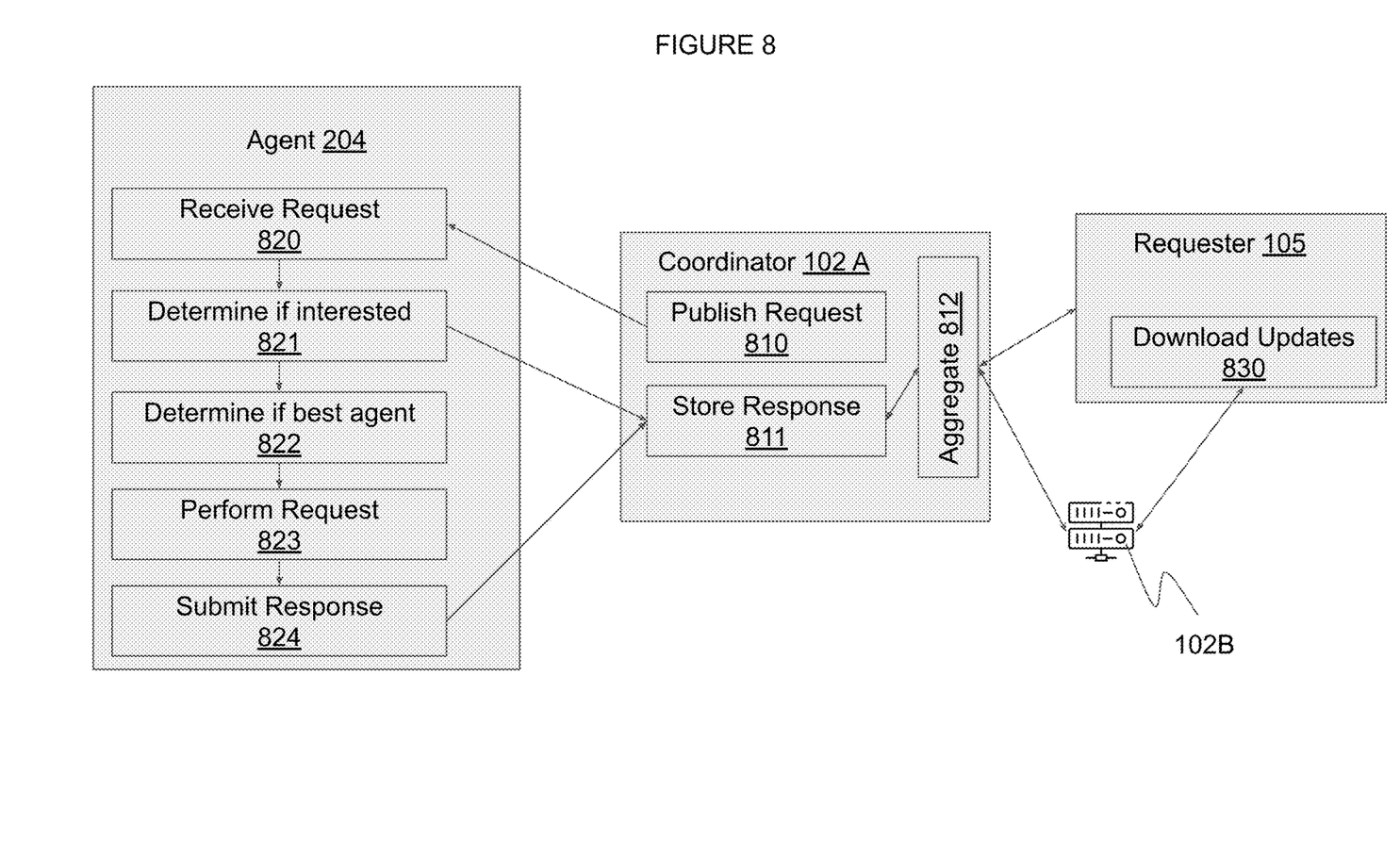
FIG. 8 depicts a flow chart diagram that describes the process of how multiple actors coordinate a response to a request from the edge back to the Requester.

FIG. 8 describes the process that Agents follow to generate a Response to the received Request and the process that Coordinators follow to aggregate the Responses received from Agents in NanoClouds and finally how the Requesters access the Response.

After the Agent receives the Request 820, it determines at a high level if this NanoCloud is interested in this Request 821, this can be done by comparing signatures of the NanoCloud with the Requester and rejecting or accepting the Request based on an acceptable Signature distance determined by the implementation of the NanoCloud. The Agent may also determine the interest based on the Publishers' credibility by contacting the Data Journaling Authority as the Request provides a list of Publishers its Request is attempting to compute against. If the Agent determined that there is an interest in the Request, it determines whether it is the best Agent in the NanoCloud to perform the Request 822 based on its available resources and whether the requested data is available to it locally or on another Agent as well as the Agent's current activity as in, if the Agent is currently performing another Request. The receiving Agent in this case is a gateway Agent 204A hence it's expected to redirect the Request to a suitable Agent if it wasn't suitable to perform the Request, this redirect process can happen at random until one of the Agents accept the Request, or it can be organized via keeping a registry of available resources. Agents may also queue Requests, in case they were currently busy and expect to be able to perform the Request later. The selected Agent then performs the Request 823 and submits the Response to 824 back to the Coordinator who sent the Response, this Response in a federated learning embodiment is the updated model weights.

It is possible for the Response to be sent back to a different Coordinator as the Response contains in it a Signature of the Requester, so it is known who the Requester is and only the Requester can download the Aggregate of the Response.

Each Coordinator Aggregates all received Responses to the same Request, this process of Aggregation can be averaging, weighted averaging, sum or another method that is described in the Request, these methods are verified by the Data Journaling Authorities at the time of Registering the Request 611 to be viable aggregation methods for maintaining the privacy of the information transferred.

Coordinators aggregate in stream fashion, that is every few updates that are received get aggregated without waiting for all updates to be received for aggregation to happen. Updates that are aggregated are then deleted which helps to ensure that no individual updates are retained in the system longer than the period required for a subset of devices to complete the Computation.

For example, when the aggregation function is an averaging function, this stream aggregation can be achieved through incremental averaging, so the Coordinator either performs averaging every time a new update is received or does it in batches. Based on the known incremental mean formula:

$$m_n = m_{n-1} + \frac{a_n - m_{n-1}}{n}.$$

Where $m_n$ is the running mean and $a_n$ is the $n_{th}$ update where the first mean is calculated as $$m_n = \frac{1}{n}\sum_{i=1}^{n} a_i.$$

When a Coordinator has finished aggregation and forwards a response to other Coordinators, it includes in the Response any information that are required for the aggregation function at the next Coordinator to perform correctly, such as the number of items averaged at the current Coordinator, so that the next Coordinator can use this number to produce the next average and so on. Requester can then download aggregates 830 from the Coordinator they sent the Request originally to, or if the system was a larger scale system, the Requester may be able to download the aggregates from another Coordinator that has access to it.

Figure 9:
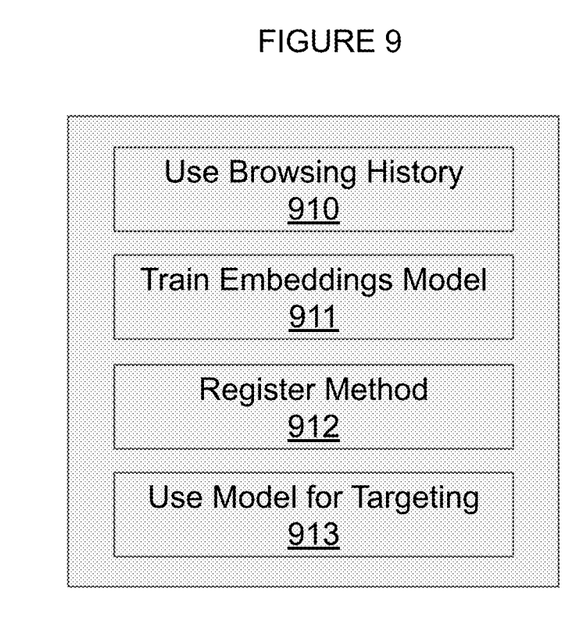
FIG. 9 depicts a flow chart diagram that describes an example process to generate a signature that represents the interests and intentions of a requester or group of edge devices.

FIG. 9 shows an example process that can be followed to generate Signatures. A process to generate Signatures is referred to hereafter as "Signature Method". Signatures methods can be registered with the Data Journaling Authority 624 which then provides these Signatures methods a unique ID. Any actor in the system can create a Signature Method. The adaption of such methods by other actors is to those actors' disclosure. These methods allow for describing NanoClouds and Requesters. The Signatures are vector representations of interests, activities or anything the creator of these methods want them to be. The Signature is then used as described earlier to measure similarities between Requesters' intentions and NanoClouds' interests.

When a Requester Registers their Request 611 they inform the Data Journaling Authority of which Signature Method this Request uses by providing its ID, the Request content itself also provides the ID of the method so that Coordinators and Agents can compare the Signature to Signatures generated using the same Signature Method. In the embodiment 9 of this disclosure the signature is a representation of the user preferences based on generated vector of word embeddings where a word2vec algorithm is trained to produce vector representations of words through a federated learner system. The training corpus can be in this embodiment the user's browsing history on a particular topic or field. Then the trained algorithm is used to generate a sum of all vectors that represent a paragraph the user writes about their intention for example "I am interested in yoga" and then Requesters describe their Requests in words for example "Looking to learn from Yoga enthusiasts their food consumption habits" and use this Signature method to generate a Signature that represent their Request.

The Signatures of the Request and the user are then compared as word vectors and the interest is identified. There is an ample of literature related to the use of word embeddings and document embeddings (Doc2Vec) to develop recommendation systems that recommend certain products or services to users, in this embodiment these techniques can be used to recommend Requests to NanoClouds.

An example process that uses the system to coordinate a Computation that is of the type model inference, is a Requester may submit a model through Coordinators targeting a dataset that contains live activity from a video streaming service, where the model infers the likelihood of a user being interested in a particular food item delivery during this activity, which is watching a movie—assuming the Requester is also a Publisher who is a food delivery service—and the model then can display through the Agent's interfaces a notification to the user prompting them to purchase the food item. For this example to work, the food delivery service needs to be able to provide properties that can be targeted as well in the sense that the request can target NanoClouds that are also subscribers to the food delivery service.

An example process for using the system to coordinate a decision, referred to hereafter as Federated Decision. A Requester requests a decision on a particular matter, the decision request is done by providing a machine learning model that is trained to infer a choice from input, and then the choice is weighted by a closeness factor that is the NanoClouds Signature closeness to that of the Requester where closeness is the negative distance. The Coordinator averages the Responses, and provides a final choice back to the Requester. A useful example of this is when a Requester attempts to learn the best choice to make in a certain driving situation, the Requester in this case can be a car manufacturer, attempting to simulate what decisions car drivers in the system would make in certain driving situations and weigh these decisions based on a the closeness of the car specifications to the car in simulation, in this embodiment the specifications are described in a Signature vector.

It is possible for a Coordinator to run from a hardware that also is a part of a NanoCloud or runs a NanoCloud Agent, this allows for a number of NanoClouds to coordinate with one another directly through a Coordinator that runs on a hardware that is also available in one of the NanoClouds, reducing the need for external networks. A Requester can use a computer that is also part of a NanoCloud. When the system is scaled down to this level, the Authorities can also run on computers that are part of this described group of NanoClouds.

The Agent software provides interfaces that show the Requests that are being processed, the data that is published to it and the history of decisions its making. These interfaces can be visual, and useful to a person who may have a NanoCloud of edge devices.

The Agent software can also provide interfaces for users to interact with it, such as the embodiment of the user describing their intention to be converted into a Signature vector or the embodiment when the user receives a notification from a food delivery service Publisher through the Agent.

It is possible for this system to be established around one Publisher and one Requester who may also be the Publisher themselves, the usefulness of the system at this scale becomes in providing transparency and search and coordination capabilities.

It is possible for this system to provide a Publisher or more the ability to directly connect to certain Coordinators, and execute certain Requests that these Publishers are authorized to execute resulting in bypassing the Agents.

When there are multiple Coordination Authorities, these Authorities can share information by either replicating information or dividing information between them.

When there are multiple Data Journaling Authorities, these Authorities can share information by either replicating information or dividing information between them.

While this disclosure doesn't describe in detail the training process in a federated learning system. Coordinators, Requesters and Agents are all equipped with the software capabilities required for a federated learner system such as the ability to coordinate multiple rounds of model training and the capabilities to train on vertically partitioned datasets across Agents and other federated learning methods.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A system to provide a scalable and reliable communication mechanism between a plurality of requesters and a plurality of edge devices comprising:
   a request from each requester of said plurality of requesters to one or more coordinators;
   for each request, said coordinators identifying, from said plurality of edge devices, one or more groups of one or more edge devices most relevant to said request based on one or more search methods, and directing said request to each group directly or indirectly via other coordinators, at least one edge device in each group comprising an agent;
   wherein said one or more search method is a vector search;
   wherein said vector search is based on a similarity comparison between a first unique signature characterizing each of said groups of one or more edge devices, and a second unique signature characterizing said request, said first and second unique signatures a vector representation of one or more parameters;
   wherein said similarity comparison can be used by the one or more coordinators to apply a weight to the response received from the selected agent for said aggregating;
   wherein, for each group, one agent is selected for receiving the request and for having access to data generated locally or on another edge device in the group, said access to the generated data controlled by data publisher, and using said generated data to compute said request to create a response, and sending said response to said one or more coordinators; and said one or more coordinators aggregating each response received from the selected agent of each group of said one or more groups into an aggregated response and sending the aggregated response to each requester.

2. The system of claim 1 wherein said one or more search method is done by coordinators specialized in specific types of edge devices.

3. The system of claim 1 wherein said one or more search method is done by coordinators specialized in specific geographies.

4. The system of claim 1 wherein said one or more search method is done by coordinators specialized in specific datasets.

5. The system of claim 1 wherein each vector representation is inferred through a machine learning algorithm trained to produce vectors of word embeddings.

6. The system of claim 1 wherein the one or more edge devices in each group can be grouped based on pre-determined criteria and treated as a cloud of edge devices, and wherein the one or more edge devices in each group are communicatively coupled via a network.

7. The system of claim 1 further comprising a data journaling authority communicatively coupled to said one or more coordinators and to said selected agent, the data journaling authority configured to produce a publisher ranking or the data publisher based on a usage statistic of said generated data; and wherein the selected agent discards said generated data controlled by the data publisher upon the publisher ranking being lower than a ranking threshold.

8. The system of claim 1 further comprising a coordinator authority communicatively coupled to said one or more coordinators and configured to certify the one or more coordinators based on operational data provided by the one or more coordinators.

9. The system of claim 1 wherein at least one of said plurality of requesters is said data publisher.

10. The system of claim 1 wherein said computations is selected from the group consisting of machine learning training using federated learning, machine learning inference, collaborative decisions and secure multi-party computations.

11. The system of claim 6 wherein said pre-determined criteria comprises each edge device in one group belonging to a same individual.

12. The system of claim 7 wherein before directing each request, the one or more coordinators communicate with the data journaling authority, and wherein the data journaling authority is further configured to register and certify the requests based on a designated standard; and wherein each request is not directed by the one or more coordinators to the one or more groups upon the request having failed to be certified by the data journaling authority.

13. The system of claim 6 wherein a same edge device of said plurality of edge devices may be grouped in two or more groups of one or more edge devices simultaneously, the two or more groups being based on different pre-determined criteria.

14. The system of claim 1 wherein at least one group of said one or more groups comprises two or more edge devices, and wherein a nominated agent located on another edge device of said at least one group is nominated to act as a gateway to receive said request from the one or more coordinators and forward the request to the selected agent in the same at least one group.

15. The system of claim 12 wherein said data publisher may direct said data journaling authority to block a request from certain requesters when certifying said request.

16. The system of claim 7 wherein the data journaling authority is further communicatively coupled to a server of the data publisher and configured to send said usage statistic or said publisher ranking of said data publisher to said server.

17. The system of claim 14 wherein at least one edge device in at least one group of said one or more groups of one or more edge devices does not comprise an agent, and wherein at said edge device not comprising an agent provides access to said generated data to the selected agent in the same group remotely.

* * * * *